Oct. 26, 1937.   H. HASTINGS   2,097,278
REVERSIBLE FLOAT GAUGE
Filed Oct. 18, 1933
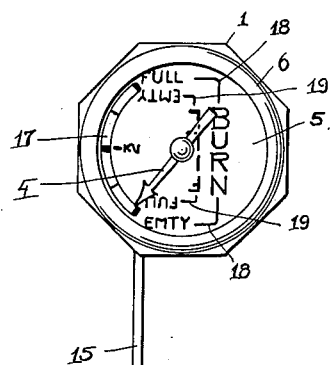
Fig.1.
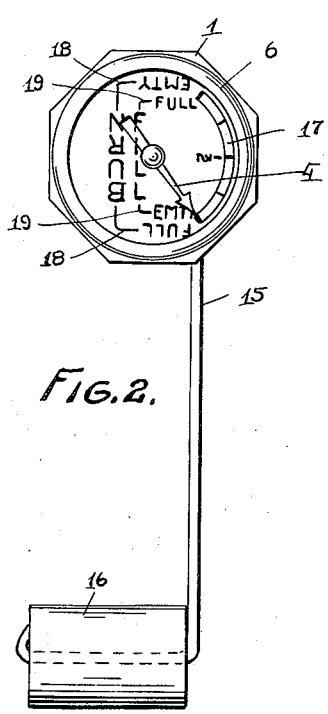
Fig.2.
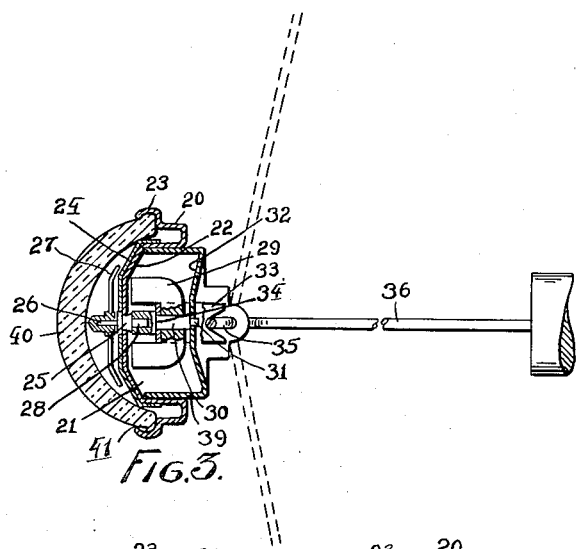
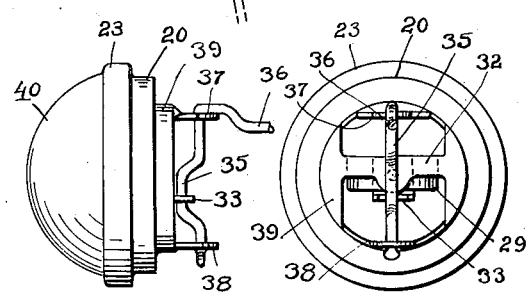
Fig.4.   Fig.5.
INVENTOR
HERBERT HASTINGS
BY
ATTORNEY Patented Oct. 26, 1937

2,097,278

UNITED STATES PATENT OFFICE 2,097,278

REVERSIBLE FLOAT GAUGE

Herbert Hastings, Brighton, N. Y.

Application October 18, 1933, Serial No. 694,119

2 Claims. (Cl. 73—317)

This invention relates to reversible gauges for use on tanks to indicate the discharging and filling thereof and has for one of its objects to provide the dial of such a gauge with but one scale in combination with reversely reading inscriptions and indicating means which make all indications of the gauge readable on this one scale and at the same time indicate whether the tank is in its discharge or its filling position.

Another object of this invention is to provide a novel construction of the gauge housing for this gauge.

A further object of this invention is to simplify the construction of such a gauge and reduce the cost of manufacture thereof to a minimum.

These and other objects of this invention and attendant advantages will become more readily apparent from the detailed description thereof which follows, reference being had to the accompanying drawing in which Figure 1 is a front elevation of the gauge in its discharge position.

Figure 2 is a front elevation of the gauge in its filling position.

Figure 3 is a longitudinal sectional view of the reversible gauge.

Figure 4 is a top plan view thereof.

Figure 5 is a rear view thereof.

In the several figures of the drawing like reference numerals indicate like parts.

The reversible gauge forming the subject matter of my present invention is especially adapted for use on liquid fuel tanks from which the fuel is fed or discharged with the tank in an upright position and is refilled with the tank in a reversed position. In this way the gauge with one dial and one scale will indicate in its discharge position the quantity of fuel and the drop of the liquid level in the tank on the discharge thereof and indicate in the reverse or filling position the raising of the liquid level and the quantity of fuel while filling the tank.

As illustrated in the several figures of the drawing the gauge comprises a suitable housing 1 with a dial, in the center of which oscillates the pointer 4. Over the dial is located the crystal 5 which is held in place on the housing 1 by means of the bezel 6.

The movement of the float arm 15 by its float 16 causes the operation of the pointer 4. But one scale 17 is provided on the dial. This scale is located on one side of the dial and extends an equal distance above and below the middle of the dial. The pointer in its horizontal position thus points to the one-half mark of the scale and indicates that the tank is half full in either its discharging or filling position.

At the upper end of the scale 17 appears the word "Full" and at the lower end the word "Emty". These two words have the indicating lines 18, 18 extending to the opposite side of the dial and point toward each other and the vertically arranged word "Burn", which is located between them. This clearly indicates to the user of the tank that with the gauge in the position in which the words "Full" and "Emty" are readable with the word "Burn" that the tank is in the discharge position in which the fuel contents thereof may be fed therefrom for "burning" purposes. In this position the pointer 4 will indicate on the graduations of the scale 17 the quantity of fuel in the tank and the lowering of the liquid level as the liquid fuel is drawn off therefrom.

Directly below the word "Full" at the upper end of the calibration 17 appears the reversely printed word "Emty" and directly above the word "Emty" at the lower end of the calibration 17 appears the reversely printed word "Full". These two reversely reading words have the indicating lines 19, 19 extending to the opposite side of the dial which point toward each other and to the vertically arranged and reversely reading word "Fill" located between them.

By reversing the gauge the reversely reading words "Full" and "Emty" with the word "Fill" will read right side up and indicate that the tank on which the gauge is mounted is in the filling position in which the pointer 4 will indicate on the scale the rise of the liquid level and how much the tank is being filled.

In order to make the two sets of inscriptions and their indicating lines more distinguishable from each other, the words indicating the discharge position of the gauge may be printed in large type and the words indicating the filling position in small type, or one inscription may be printed in one color and the other in another color.

In Figures 3 to 5 inclusive I have illustrated the construction of the reversible gauge. This gauge is an improvement over the gauge illustrated in Patent No. 1,911,099 issued May 23, 1933 and the improved construction considerably reduces the cost of manufacture of this type of reversible gauge and eliminates constructional details which are impractical in practice and result in an inferior product.

The housing 20 of this gauge is formed of sheet metal so as to provide in one piece a non-magnetic magnet housing 21, a dial support 22 and a bezel 23 surrounding the dial support and magnet housing. A cup shaped dial 24 is placed over the dial support 22 and is telescoped over the outside of the magnet housing on which it is held in place by its frictional contact therewith. Anchored centrally of the dial support 22 and projecting thru the dial 24 is the stud 25 which provides the pivot pin 26 for the pointer 27 in front of the dial 24 on the outside of the magnet housing and the pivot pin 28 for the magnet 29 on the inside of the magnet housing.

The magnet 29 is substantially U shaped and is mounted on a pivot shaft 30. One end of this shaft is hollow to receive the pivot pin 28. The opposite reduced end of the shaft is journaled in the bearing 31 of the cross member 32. In this way the magnet is centrally mounted within the magnet housing and is adapted to oscillate therein.

Carried by the magnet 29 is the bifurcated bracket or crank 33 which is held in the end of the U shaped open center thereof by the shoulder 34 provided on the pivot shaft 30. This bifurcated bracket projects to one side of the magnet and extends rearwardly thereof so as to have the crank 35 engage into its bifurcated end.

The crank 35 forms part of the float arm 36 and is journaled in bearings provided in the lugs 37 and 38 struck up from the end of the cup member 39. This cup member is telescoped into the magnet chamber and is suitably held in place therein. The cross member 32 in which the bearing 31 is provided also forms part of the cup member 39 so that this member serves as a supporting member for one end of the pivot shaft of the magnet, the float arm and its operating crank and locates these members in proper relation to each other and to the bifurcated bracket 33.

In fastening the bifurcated bracket 33 to the magnet 29, as illustrated and described, this bracket is rigidly anchored thereto without the use of solder. This is important because the magnet is made of hard steel and in soldering a member to it, as is necessary in the construction illustrated in the patent above referred to, the heat applied to the magnet during the soldering process will draw the temper from the magnet and cause the magnet to lose its magnetism.

The face of the dial is covered by the lens shaped crystal which is provided with an annular ridge 41. The bezel 23 is drawn over this ridge so as to lock the crystal to the housing 20 and form a suitable dial chamber in front of the dial in which the pointer 27 is free to oscillate on the operation thereof by the magnet 29.

I claim:

1. A gauge having a sheet metal housing comprising a case formed up as a single member having a cylindrical magnet housing centrally thereof and a bezel surrounding said magnet housing, a supporting member telescopically mounted within said housing at the rear thereof, a dial telescopically supported at the front thereof, a pivot stud fixed in said magnet housing, a float operated magnet pivotally suspended between said supporting member and said pivot stud, and an indicator mounted in front of said dial operated by said magnet.

2. A gauge having a sheet metal housing comprising a case formed up as a single member having an elongated cylindrical magnet housing, an annular channel surrounding said housing, a bezel formed at the outer end of said annular channel, a sleeve member telescopically mounted in said magnet housing and projecting rearwardly thereof, a pair of bearings provided in the perimeter of said sleeve member, a cross member provided across said sleeve member, a crank pivotally suspended in said pair of bearings, and a magnet pivotally supported in part on said cross member within said magnet housing and connected to said crank.

HERBERT HASTINGS.